Patented Aug. 31, 1954

UNITED STATES PATENT OFFICE 2,688,043

UNSATURATED $C_6Cl_6$

Elbert C. Ladd, Passaic, and Herbert Sargent, Glen Rock, N. J., assignors to United States Rubber Company, New York, N. Y., a corporation of New Jersey No Drawing. Application May 12, 1949, Serial No. 92,946

2 Claims. (Cl. 260—648)

The invention relates to a novel hydrogenative coupling reaction by which hexachloropropene is converted to a new unsaturated compound of six carbon atoms.

It is known that certain aliphatic compounds of 3 or more carbon atoms, and containing a trihalogenomethyl group, will react with hydrogen in the presence of base and a hydrogenation catalyst to yield coupled products:

(1)
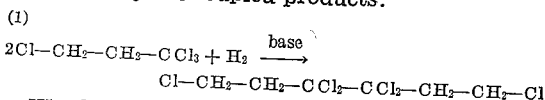

$2Cl-CH_2-CH_2-CCl_3 + H_2 \xrightarrow{base}$
$Cl-CH_2-CH_2-CCl_2-CCl_2-CH_2-CH_2-Cl$ We have found, however, that hexachloropropene reacts slowly to produce only a minor yield of coupled products under such conditions. We have now discovered that if the hydrogenation is carried out under neutral or acidic conditions, the coupling reaction is unexpectedly accelerated and there is obtained a satisfactory yield of a unique product having the empirical formula $C_6Cl_6$. The intense red color of this new compound, as well as its physical constants and its ability to undergo further catalytic hydrogenation to n-hexane suggest that the new compound is the chlorine-substituted divinylacetylene formed by the following reaction:

(2)
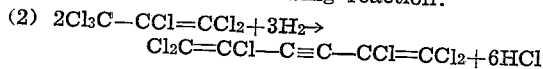

$2Cl_3C-CCl=CCl_2+3H_2 \rightarrow$
$Cl_2C=CCl-C\equiv C-CCl=CCl_2+6HCl$

The product is useful in the preparation of dyes, pharmaceuticals, plasticizers and polymers.

In the preparation of this new compound, hexachloropropene is reacted under neutral or acidic conditions with about 1.5 moles of gaseous hydrogen per mole of hexachloropropene (in accordance with reaction (2)) in the presence of a small quantity, e. g., 0.1–1.0 gram per mole of hexachloropropene, of a hydrogenation catalyst such as Raney nickel, platinum, palladium, or a salt or oxide thereof, e. g., platinum oxide. The reaction proceeds readily at room temperature, e. g., 25° C., and atmospheric pressure, elevated temperatures and pressures being generally unnecessary. The reaction is facilitated by solvents, particularly hydroxylic solvents, including alcohols such as methanol and ethanol.

The product is recovered by filtration or preferential extraction and is purified by crystallization.

The following example discloses our invention in more detail.

Example

To a mixture of 100 g. of hexachloropropene and 50 mls. of absolute ethanol is added a prereduced suspension of 0.3 g. of platinum oxide in 20 mls. of absolute ethanol containing 0.1 ml. of glacial acetic acid, prepared by the conventional procedure of Adams et al. ("Organic Chemistry"—Coll. vol. 1 by Gilman and Blatt). The mixture is enclosed in a glass vessel connected to a reservoir of hydrogen at 25° C. and atmospheric pressure. The mixture is then agitated vigorously until about 11.5 liters of hydrogen have been absorbed. After the first two liters of hydrogen have been reacted, a colorless oil begins to appear in the reaction mixture. As the reaction progresses, the oil becomes red in color and reddish-brown crystals separate out. These are filtered off at the end of the reaction together with the crystalline deposit which has appeared on the surface of the catalyst. The crystals are dissolved in a mixture of hot acetone and n-hexane and recrystallized to yield 21 g. of brick-red needles, M.Pt. 149.5–150° C.

| | Percent C | Percent Cl |
|---|---|---|
| Analysis: | | |
| Found | 25.93 | 73.23 |
| Theory ($C_6Cl_6$) | 25.25 | 74.70 |

(a) A solution of 7.12 g. of the above product in 100 ml. of absolute ethanol, was admixed with a prereduced suspension of 0.3 g. platinum oxide in 20 ml. of absolute ethanol containing 0.1 ml. of glacial acetic acid and hydrogenated as in Example 1. After 3 hours the absorption of hydrogen ceases, a total of about 4.5 liters having been reacted.

Fractional distillation yields 1.39 g. of n-hexane, B. 69–70° C./760 mm.; $n_D^{20}$ 1.3750.

Having thus described our invention, what we claim and desire to protect by Letters Patent is:

1. An unsaturated material of empirical formula $C_6Cl_6$, which crystallizes from a mixture of acetone and n-hexane in the form of brick-red needles, M. P. 149.5–150° C.

2. The method which comprises agitating vigorously hexachloropropene with 1.5 molar equivalents of gaseous hydrogen under non-alkaline conditions in the presence of 0.1 to 1.0 gram, per mole of hexachloropropene, of a hydrogenation catalyst until an unsaturated red compound of empirical formula $C_6Cl_6$ is formed, and isolating said compound.

References Cited in the file of this patent

UNITED STATES PATENTS

| Number | Name | Date |
|---|---|---|
| 2,095,240 | Coleman et al. | Oct. 12, 1937 |

OTHER REFERENCES

Prins, "Rec. des Trav. Chim. des Pays Bas," vol. 51 pp. 1070–1 (1932).

Vavon, "Comptes Rendus," vol. 206, pp. 1387–9 (1938).

Prins, "Rec. des Trav. Chim. des Pays-Bas," vol. 65, pp. 455–467 (1946).

Krynitsky et al., "Jour. Am. Chem. Soc.," vol. 69, pp. 1918–1919 (1947).

Roedig, "Experienta," vol. 4, p. 306 (1948).

Roedig, "Annalen," vol. 569, pp. 161–3 (1950).